United States Patent
Kinkead et al.

(10) Patent No.: US 11,849,657 B2
(45) Date of Patent: Dec. 26, 2023

(54) METHODS AND APPARATUS FOR AERATING TURF

(71) Applicant: TURFCO MANUFACTURING, INC., Blaine, MN (US)

(72) Inventors: George Kinkead, Mendota Heights, MN (US); Nicholas Oeding, Shoreview, MN (US)

(73) Assignee: TURFCO MANUFACTURING, INC, Blaine, MN (US)

( * ) Notice: Subject to any disclaimer, the term of this patent is extended or adjusted under 35 U.S.C. 154(b) by 1008 days.

(21) Appl. No.: 16/592,960

(22) Filed: Oct. 4, 2019

(65) Prior Publication Data

US 2020/0113114 A1 Apr. 16, 2020

Related U.S. Application Data

(60) Provisional application No. 62/800,584, filed on Feb. 4, 2019, provisional application No. 62/745,557, filed on Oct. 15, 2018.

(51) Int. Cl.
*A01B 49/06* (2006.01)
*A01C 7/08* (2006.01)
(Continued)

(52) U.S. Cl.
CPC ............ *A01B 49/065* (2013.01); *A01B 45/02* (2013.01); *A01C 7/08* (2013.01); *A01G 20/30* (2018.02); *A01M 7/00* (2013.01)

(58) Field of Classification Search
CPC ....... A01B 49/065; A01B 45/00; A01B 45/02; A01B 59/00; A01C 7/08; A01G 20/30; A01M 7/00; B60D 2001/008
(Continued)

(56) References Cited

U.S. PATENT DOCUMENTS 1,157,670 A  10/1915  Boswell
1,778,334 A  10/1930  Pedersen
(Continued)

FOREIGN PATENT DOCUMENTS

AU    256472    5/1963
EP    0140989   5/1985
(Continued)

OTHER PUBLICATIONS

Plagr Walk Behind Power Aerators, web page, (5 pgs.)—no date—.
(Continued)

*Primary Examiner* — Jamie L McGowan
(74) *Attorney, Agent, or Firm* — Best & Flanagan LLP

(57) ABSTRACT

Optional attachments, such as a drop seeder and a sprayer unit, can be removably attached to the front plate of a turf aerator. The attachment includes a hitch slideably received in a tubular receiver and pinned therein by a pin. A lock is pivotal relative to the attachment from an unlocked position to a locked position with the front plate received in slots of the lock. The lock is pivoted relative to the attachment by a rod which is threadably received in the hitch. Valve openings in a valve plate are aligned or mis-aligned with lower openings formed in a hopper mounted to the hitch by a linear electric actuator. A lever is pivotably mounted to a housing which is removably attached to the chassis of the turf aerator and activates the linear electric actuator and a switch controlling an agitator. A valve is alternately in fluid communication with a spray nozzle mounted relative to the hitch and a spray wand. A switch mounted to the chassis is electrically connected to a motor driving a pump in fluid communication with a tank and the valve.

9 Claims, 13 Drawing Sheets

(51) Int. Cl.
    *A01M 7/00* (2006.01)
    *A01G 20/30* (2018.01)
    *A01B 45/02* (2006.01)

(58) Field of Classification Search
    USPC ................................. 280/437, 416.3, 512
    See application file for complete search history.

(56) References Cited

U.S. PATENT DOCUMENTS

| | | | |
|---|---|---|---|
| 1,807,182 A | 5/1931 | Stoner | |
| 2,205,997 A | 6/1940 | Wallace et al. | |
| 2,229,497 A | 1/1941 | Dontje | |
| 2,234,534 A | 3/1941 | Reno | |
| 2,244,099 A | 6/1941 | Chase | |
| 2,260,110 A | 10/1941 | Blohm | |
| 2,400,204 A | 5/1946 | Lindskog | |
| 2,649,061 A | 8/1953 | Hawkins et al. | |
| 2,675,750 A | 4/1954 | Boyer | |
| 2,750,859 A | 6/1956 | Smithburn | |
| 2,778,291 A | 1/1957 | Kerns | |
| 2,823,597 A | 2/1958 | Cadwallader | |
| 2,835,182 A | 5/1958 | Smithburn | |
| 2,888,994 A | 6/1959 | Hoff et al. | |
| 3,148,737 A | 9/1964 | Lunsford | |
| 3,171,498 A | 3/1965 | Logan | |
| 3,429,378 A | 2/1969 | Mascaro | |
| 3,462,173 A * | 8/1969 | Bock | B60D 1/167 280/484 |
| 3,504,748 A | 4/1970 | Croft | |
| 3,534,818 A | 10/1970 | Mascaro | |
| 3,566,973 A | 3/1971 | Blair | |
| 3,675,724 A | 7/1972 | Schneider | |
| 3,792,734 A | 2/1974 | Ellis et al. | |
| 3,851,894 A * | 12/1974 | St. Pierre | B62D 49/04 37/231 |
| 3,853,255 A * | 12/1974 | Spencer | B60R 9/10 224/521 |
| 4,089,387 A | 5/1978 | Cook | |
| 4,127,951 A * | 12/1978 | Hatch | E01H 5/06 37/231 |
| 4,289,224 A | 9/1981 | Dobberpuhl | |
| 4,336,760 A | 6/1982 | Cohen et al. | |
| 4,438,873 A | 3/1984 | Kaercher, Jr. | |
| 4,476,938 A | 10/1984 | McKay | |
| 4,550,783 A | 11/1985 | Hansen | |
| 4,601,163 A | 7/1986 | Trelford | |
| 4,645,012 A | 2/1987 | Hansen et al. | |
| 4,750,565 A | 6/1988 | Hansen et al. | |
| 4,753,298 A | 6/1988 | Hansen et al. | |
| 4,773,486 A | 9/1988 | Huber et al. | |
| 4,776,404 A | 10/1988 | Rogers et al. | |
| 4,826,195 A * | 5/1989 | Boyles | B62D 49/02 280/402 |
| 4,830,145 A | 5/1989 | Hansen | |
| 4,867,244 A | 9/1989 | Cozine et al. | |
| 4,881,602 A | 11/1989 | Hansen et al. | |
| 4,962,599 A * | 10/1990 | Harris | E01H 5/06 37/234 |
| 5,009,270 A | 4/1991 | Vangsgard | |
| 5,029,652 A | 7/1991 | Whitfield | |
| 5,031,927 A * | 7/1991 | Frenette | E01H 5/06 37/231 |
| 5,036,608 A * | 8/1991 | Ciula | E01H 5/066 37/234 |
| 5,036,655 A | 8/1991 | Holloway | |
| 5,119,880 A | 6/1992 | Zehrung, Jr. et al. | |
| 5,142,852 A | 9/1992 | Nelson | |
| 5,207,278 A | 5/1993 | Hatlen | |
| 5,209,306 A | 5/1993 | Whitfield | |
| 5,307,952 A | 5/1994 | Worrel et al. | |
| 5,307,965 A | 5/1994 | Worrel | |
| 5,398,767 A | 3/1995 | Warke | |
| 5,454,433 A | 10/1995 | Worrel et al. | |
| 5,460,229 A | 10/1995 | Mattis | |
| 5,478,104 A | 12/1995 | Worrel et al. | |
| 5,571,252 A | 11/1996 | Worrel et al. | |
| 5,586,604 A | 12/1996 | Postema | |
| 5,673,756 A | 10/1997 | Classen | |
| 5,680,903 A | 10/1997 | Oliver | |
| 5,794,708 A | 8/1998 | Brophy | |
| 5,802,994 A | 9/1998 | Kinkead et al. | |
| 5,823,269 A | 10/1998 | Leclerc | |
| 6,024,033 A | 2/2000 | Kinkead et al. | |
| 6,041,869 A | 3/2000 | Lewis et al. | |
| 6,058,860 A | 5/2000 | Kinkead et al. | |
| 6,102,129 A | 8/2000 | Classen | |
| 6,149,079 A | 11/2000 | Kinkead et al. | |
| 6,151,811 A | 11/2000 | Barreto | |
| 6,179,061 B1 | 1/2001 | Fiore | |
| 6,200,066 B1 | 3/2001 | Humphrey | |
| 6,209,231 B1 * | 4/2001 | Curtis | E01H 5/06 37/231 |
| 6,241,025 B1 | 6/2001 | Myers et al. | |
| 6,273,197 B1 | 8/2001 | Marlow | |
| 6,336,600 B1 * | 1/2002 | Jessen | A01C 7/06 239/650 |
| 6,381,880 B1 * | 5/2002 | Curtis | E01H 5/06 37/231 |
| 6,415,872 B2 | 7/2002 | Myers et al. | |
| 6,443,474 B1 * | 9/2002 | Kay | B60D 1/145 280/495 |
| 6,675,905 B2 | 1/2004 | Hill et al. | |
| 6,684,960 B1 | 2/2004 | Ng | |
| 6,708,773 B1 | 3/2004 | Kinkead et al. | |
| 6,742,799 B1 * | 6/2004 | Hansen | B60D 1/52 280/495 |
| 6,758,283 B2 | 7/2004 | Lauer et al. | |
| 6,892,821 B2 | 5/2005 | Wessel | |
| 7,100,702 B2 | 9/2006 | Classen | |
| 7,334,357 B1 * | 2/2008 | Altheide | E01H 5/06 37/231 |
| 7,341,114 B2 | 3/2008 | Classen et al. | |
| 7,543,842 B1 * | 6/2009 | Fiorini | B62B 3/025 280/43 |
| 7,779,929 B2 | 8/2010 | Maas et al. | |
| 7,992,327 B2 * | 8/2011 | Gamble, II | E02F 3/627 37/232 |
| 8,056,828 B1 | 11/2011 | Kline et al. | |
| 8,079,422 B2 | 12/2011 | Maas et al. | |
| 8,235,410 B2 * | 8/2012 | Weber | B60D 1/1675 280/495 |
| 8,291,991 B1 | 10/2012 | Cook | |
| 8,590,632 B2 | 11/2013 | Berglund | |
| 8,632,018 B2 | 1/2014 | Kline et al. | |
| 8,733,477 B1 | 5/2014 | Cook | |
| 8,832,974 B2 * | 9/2014 | Koch | E01H 5/061 37/272 |
| 8,967,654 B1 * | 3/2015 | Riibe | B60D 1/06 280/507 |
| 9,241,437 B2 | 1/2016 | Bryant et al. | |
| 9,474,196 B2 | 10/2016 | Kinkead et al. | |
| 9,622,397 B2 | 4/2017 | Bos | |
| 10,194,582 B2 | 2/2019 | Kline et al. | |
| 10,212,872 B2 | 2/2019 | Kinkead et al. | |
| 10,766,319 B2 * | 9/2020 | Hack | B60D 1/52 |
| 10,849,262 B2 * | 12/2020 | Kinkead | A01B 45/023 |
| 2001/0033068 A1 * | 10/2001 | Melesko | B60D 1/44 280/455.1 |
| 2001/0045720 A1 * | 11/2001 | Schlicht | B60R 3/02 280/166 |
| 2002/0084082 A1 | 7/2002 | Hill et al. | |
| 2003/0127813 A1 * | 7/2003 | Lenkman | B62D 51/04 280/43.1 |
| 2003/0178207 A1 | 9/2003 | Lauer | |
| 2003/0201106 A1 * | 10/2003 | Jessen | A01B 45/02 172/21 |
| 2004/0154811 A1 | 8/2004 | Kinkead et al. | |
| 2005/0000706 A1 | 1/2005 | Maas et al. | |
| 2005/0006110 A1 | 1/2005 | Wessel | |
| 2005/0076543 A1 * | 4/2005 | Curtis | E01H 5/066 37/231 |
| 2005/0173134 A1 | 8/2005 | Maas et al. | |

(56) References Cited

U.S. PATENT DOCUMENTS

| | | | |
|---|---|---|---|
| 2005/0241553 A1* | 11/2005 | Dika | A01C 7/18 |
| | | | 111/170 |
| 2006/0048952 A1 | 3/2006 | Classen | |
| 2006/0055150 A1* | 3/2006 | Curtis | E01H 5/06 |
| | | | 280/477 |
| 2006/0070750 A1 | 4/2006 | Classen et al. | |
| 2007/0222183 A1* | 9/2007 | Daniel | B60D 1/246 |
| | | | 280/479.1 |
| 2008/0023940 A1* | 1/2008 | Warford | B60D 1/583 |
| | | | 280/507 |
| 2008/0029278 A1 | 2/2008 | Wynings | |
| 2008/0101899 A1* | 5/2008 | Slonecker | B60D 1/00 |
| | | | 414/462 |
| 2010/0201102 A1* | 8/2010 | Weaver | B60D 1/24 |
| | | | 280/506 |
| 2011/0079659 A1* | 4/2011 | Wilken | A01G 25/09 |
| | | | 239/74 |
| 2011/0203816 A1 | 8/2011 | Hurley | |
| 2012/0006571 A1 | 1/2012 | Dart | |
| 2013/0014965 A1 | 1/2013 | Barger | |
| 2013/0076008 A1* | 3/2013 | Su | B60D 1/54 |
| | | | 280/515 |
| 2013/0292145 A1* | 11/2013 | Pastour | A01B 45/02 |
| | | | 172/22 |
| 2014/0224512 A1 | 8/2014 | Skaff et al. | |
| 2015/0107863 A1 | 4/2015 | Bryant | |
| 2015/0217703 A1* | 8/2015 | Deming | B60R 9/06 |
| | | | 224/519 |
| 2015/0271983 A1 | 10/2015 | Bos | |
| 2016/0138233 A1* | 5/2016 | Barker | E01H 5/061 |
| | | | 37/231 |
| 2017/0113501 A1* | 4/2017 | Reynolds | B60D 1/52 |
| 2017/0217267 A1* | 8/2017 | Vetkos | B66D 1/28 |
| 2018/0103571 A1 | 4/2018 | Kinkead et al. | |
| 2019/0183028 A1 | 6/2019 | Kinkead et al. | |
| 2020/0086701 A1* | 3/2020 | Pulliam | B60D 1/44 |
| 2020/0113114 A1* | 4/2020 | Kinkead | A01B 49/065 |

FOREIGN PATENT DOCUMENTS

| | | |
|---|---|---|
| GB | 472443 | 9/1937 |
| GB | 1558467 | 1/1980 |
| GB | 2347400 | 9/2000 |
| KR | 20160144130 A | 12/2016 |
| KR | 2017010989 A | 2/2017 |

OTHER PUBLICATIONS

Billy Goat Industries—EZair Aerators, web page (2 pgs.)—no date—.

Classen Manufacturing, Inc., web page (2 pgs.)—no date—.

BlueBird International Products-Turf Care, web page (1 pg.)—no date—.

BlueBird Internation Products-Turf Care-424, web page (2 pgs.)—no date—.

* cited by examiner

METHODS AND APPARATUS FOR AERATING TURF

BACKGROUND

Methods and apparatus for aerating, seeding, and applying liquids to turf and locks for locking attachments to a chassis which could be used in such apparatus are shown and described. The conception of a pair of tine shafts driven through a differential shaft in a turf aerator as taught in U.S. Pat. No. 6,708,773, which is hereby incorporated herein by reference, represented a major innovation in the turf field. In particular, the ability to operatively connect and clutch one or the other or both of the tine shafts, whether done mechanically, hydrostatically, or in other manners or combinations, allow the operator to make turns while the tines are still in contact with the turf. However, once turning was a possibility, operators desired further ability in directing the turf aerator during operation.

As an example, in an alternate approach by others to this innovation, outer tine assemblies were rotatably mounted at the two end portions of a single driven shaft including inner tine assemblies secured to the single driven shaft intermediate the outer tine assemblies. Although increasing turning ability relative to conventional turf aerators existing prior to U.S. Pat. No. 6,708,773, this alternate approach did not have the turning ability achieved by the turf aerator of U.S. Pat. No. 6,708,773. U.S. Pat. No. 9,474,196, reflects another major innovation in the turf field, with U.S. Pat. No. 9,474,196 also being incorporated herein by reference.

Rolling tine aerators aerate to a given depth based on the down pressure placed on the tines. Current riding aerating machines control depth by setting a fixed hydraulic pressure to produce a given down pressure. Thus, as soil conditions change on the lawn, the depth of tines will change. The user is constantly having to adjust hydraulic pressure to compensate for those changes in conditions on a lawn to get the proper down pressure and corresponding depth desired. Consistent depth is desired, so if the down pressure is too light on harder soil conditions, the tines will not penetrate to the desired depth, and if the down pressure is too heavy on softer soil conditions, the tines will penetrate past the desired depth, possibly hitting things such as tree roots, irrigation systems, etc. that are buried.

Current riding aerator machines raise and lower the tine shaft, while the housing that shields the tines remains fixed to the frame of the machine. Due to width constraints, this requires the drive chains for the tines to be inside the housing in between sets of tines, where dirt and debris from aerating can get into the chains and cause them to stretch and prematurely wear out.

Broadcast seeder attachments currently exist to put on the front of riding aerators. However, a problem with a broadcast seeder is it spreads 2-4 times the aeration width of the riding aerator. The user can do this two ways—1) the user has to go back over the lawn to seed after it has been aerated, which is hard to see where you have already seeded, or 2) the user seeds while aerating, but has to remember to turn on the broadcast seeder every other pass for example. Another issue with the broadcast seeder is it is easy to accidentally throw seed in areas that aren't desired, such as a flower bed, requiring the user to clean seed out of the flower bed.

Similarly, it is often desired that liquids such as herbicides, insecticides, or the like be applied to the area being aerated. This was conventionally performed by separate operation of a spray applicator.

Currently riding aerators use a receiver hitch at the front of the machine to attach attachments to the machine. The receiver is wider than the hitch to allow easy installation of the hitch. This extra slop causes the attachment to vibrate on the front of the machine because there is nothing holding it securely to the frame, with the pin only keeping the attachment from coming out of the receiver.

Thus, a need for improvement in methods and apparatus exists in the field of turf management and in the field of holding attachments to a chassis.

SUMMARY

This need and other problems in the fields of turf management and attachment locking are solved by providing an apparatus for aerating, seeding and/or spraying turf and an attachment locking apparatus.

A turf aerator is configured with components that provide a user with the ability to control and accordingly set a desired level of depth for tine penetration into the ground, which thereby automatically adjusts the necessary hydraulic pressure to reach the set level of depth. The user can use a depth control lever on the turf aerator in order to set the desired level of depth. The depth control lever may be operatively connected to an adjustable switch for which the user can adjust the positioning. A fixed switch may be positioned above the adjustable switch when the turf aerator is upright. The fixed switch can define the raised position of the hydraulic cylinder and the adjustable switch can control the lowered position of the hydraulic cylinder.

After the user sets the switch using the depth control lever to a desired level of depth, the retraction and elongation of the hydraulic cylinder is determined by the bounds between the adjusted switch and the fixed switch. For example, a trip may be positioned between the fixed switch and the adjustable switch, and the trip's position corresponds to the retraction and elongation of the hydraulic cylinder. Accordingly, during operation, the fixed switch defines the maximum retraction of the hydraulic cylinder and the adjustable switch defines the maximum elongation of the hydraulic cylinder. Advantageously, when the ground is respectively harder or softer during operation of the turf aerator, the tines may still penetrate to the set depth without the user having to specifically adjust hydraulic pressure. This way, consistent depth is reached regardless of the turf's density.

The turf aerator further employs drive chains that are utilized for gearing the tine assemblies and wheels for movement, in which the drive chains are positioned on an exterior of a tine housing in order to protect the drive chains from dirt and debris during the turf aeration. Positioning the drive chains such that they are protected from the turf aeration allows for an increased life of the drive chains, which thereby reduces cost for repairs and saves time for users.

The turf aerator includes a drop seeder removably attached to a chassis. A valve plate is moved by a linear electric actuator to align or mis-align valve openings with lower openings of a hopper. A lever, which is pivotably mounted to a housing in turn removably fixed to the chassis, is pivoted to actuate the linear electric actuator and to actuate a switch controlling an agitator inside of the hopper.

The turf aerator includes a spray unit having a tank removably attached to a chassis. A valve is in fluid communication with a pump in fluid communication with the tank and driven by an electric motor. The valve is alternately in fluid communication with a spray nozzle mounted relative to the tank and a spray wand moveable relative to the tank and slideably received in a tube mounted to the chassis. A switch is mounted to the chassis and electrically connected to the electric motor.

A first plate extends generally perpendicular to a receiver extending in a longitudinal direction. A hitch is configured to be slideably received in the receiver. A lock is pivotably mounted relative to the hitch between locked and unlocked positions. In the locked position, the lower edge of the front plate is received in slots of the lock. The hitch is pinned in the receiver, and a rod extending through the lock is movable relative to the hitch to pivot the lock.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
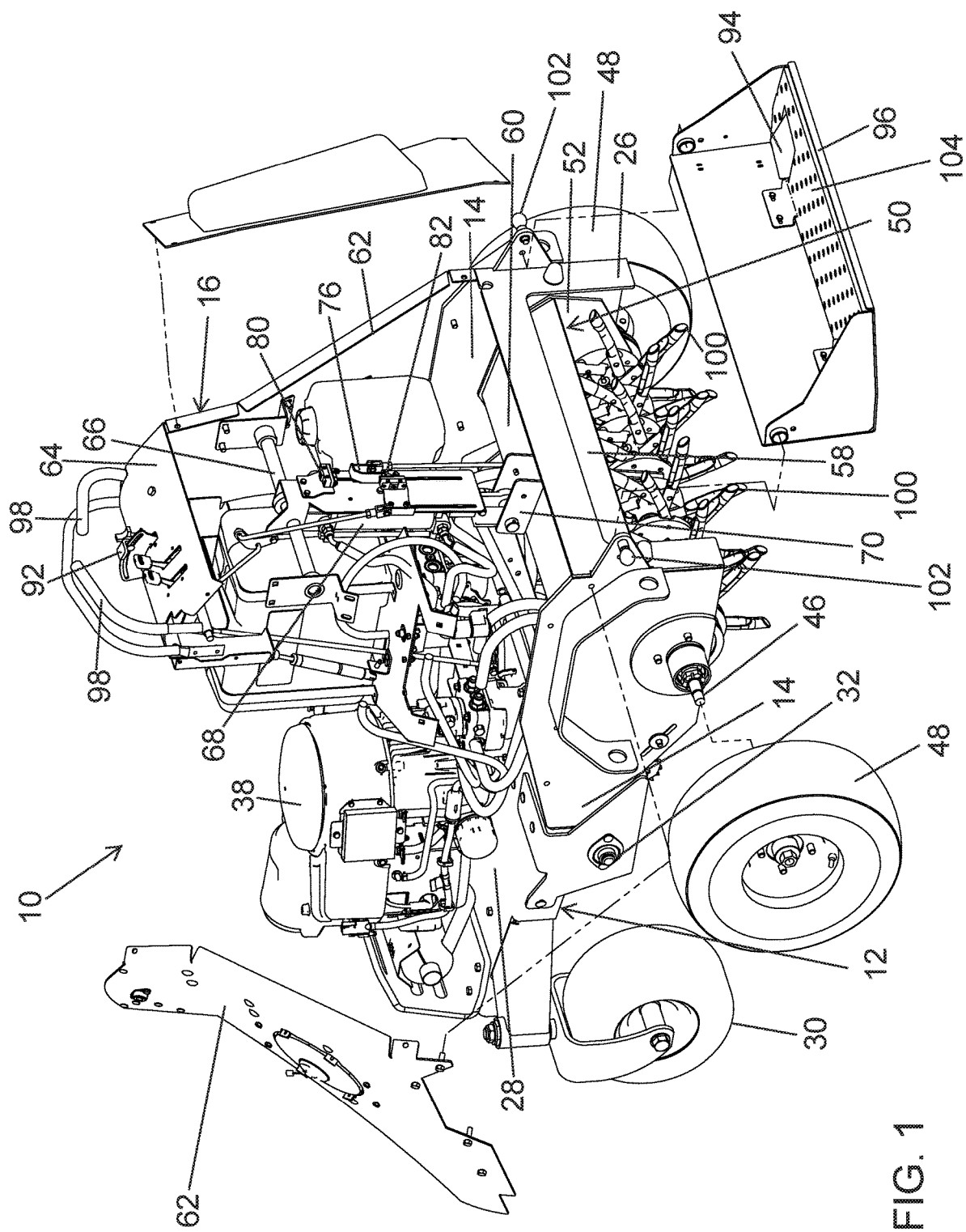
FIG. 1 shows an exploded, rear perspective view of an illustrative embodiment of an apparatus for aerating turf.

All figures are drawn for ease of explanation of the basic teachings only; the extensions of the figures with respect to number, position, relationship, and dimensions of the parts to form the illustrative embodiments will be explained or will be within one skilled in the art after the following description has been read and understood. Further, the exact dimensions and dimensional proportions to conform to specific force, weight, strength, and similar requirements will likewise be within one skilled in the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

Illustrative embodiments of an apparatus for aerating turf are shown in the drawings and generally designated 10. Generally, turf aerator 10 includes a chassis 12 including first and second side plates 14, front and back plates 24 and 26, respectively, extending between side plates 14, and a top plate 28 extending between side plates 14 and from front plate 24 towards, but spaced from, back plate 26. In the form shown, top plate 28 is generally an isosceles trapezoid. Chassis 12 is moveably supported on turf adjacent to front plate 24 by caster wheels 30, with caster wheels 30 located outwardly of side plates 14. The wheels may protrude from each side which thereby provides additional stability to the turf aerator.

A motor 38 is mounted to top plate 28 adjacent to front plate 24. Motor 38 is in driving connection to hydraulic pumps.

Figure 2:
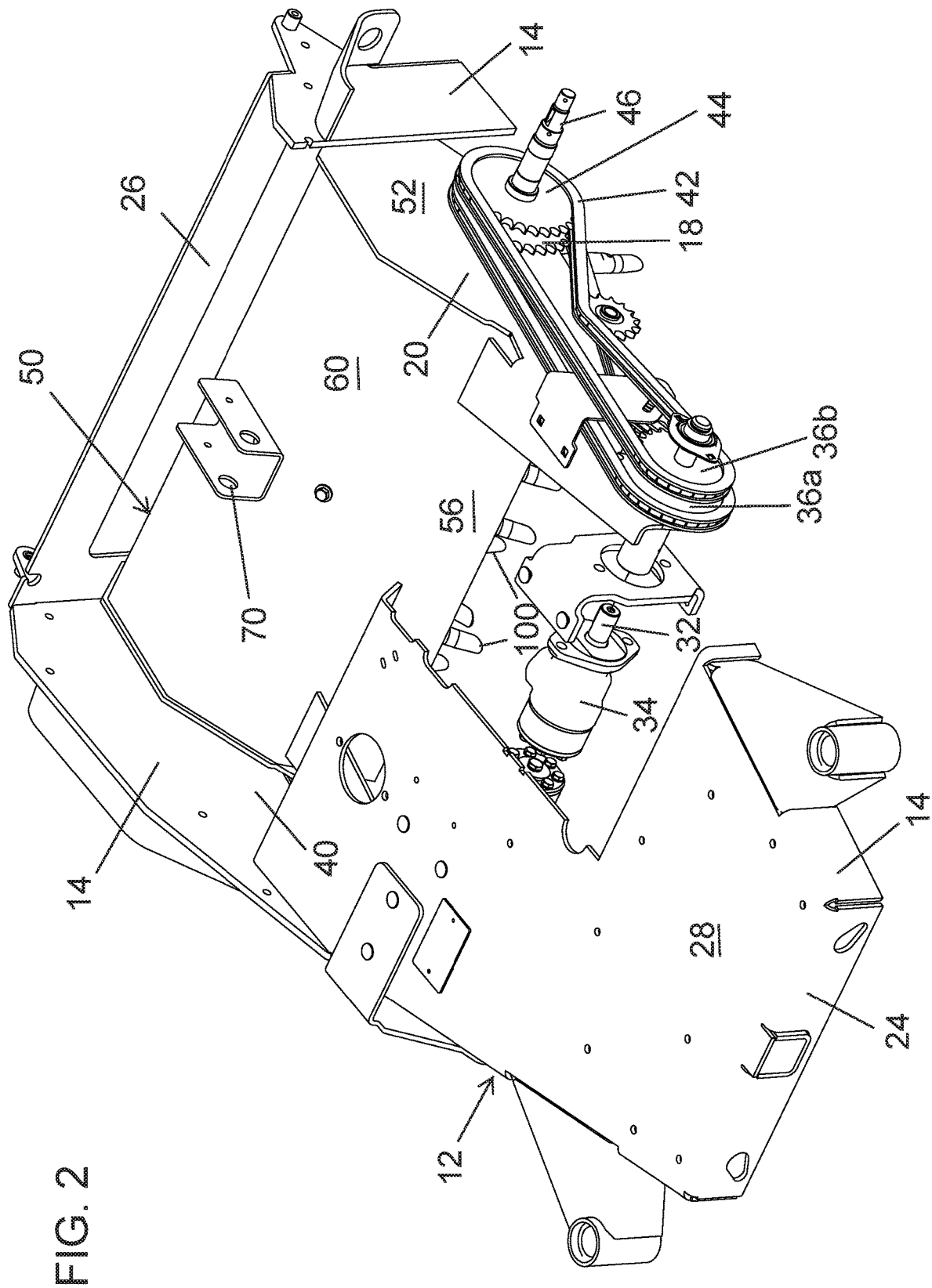
FIG. 2 shows a perspective view of some of the components of the aerating apparatus of FIG. 1, with portions broken away to show internal details.
Figure 3:
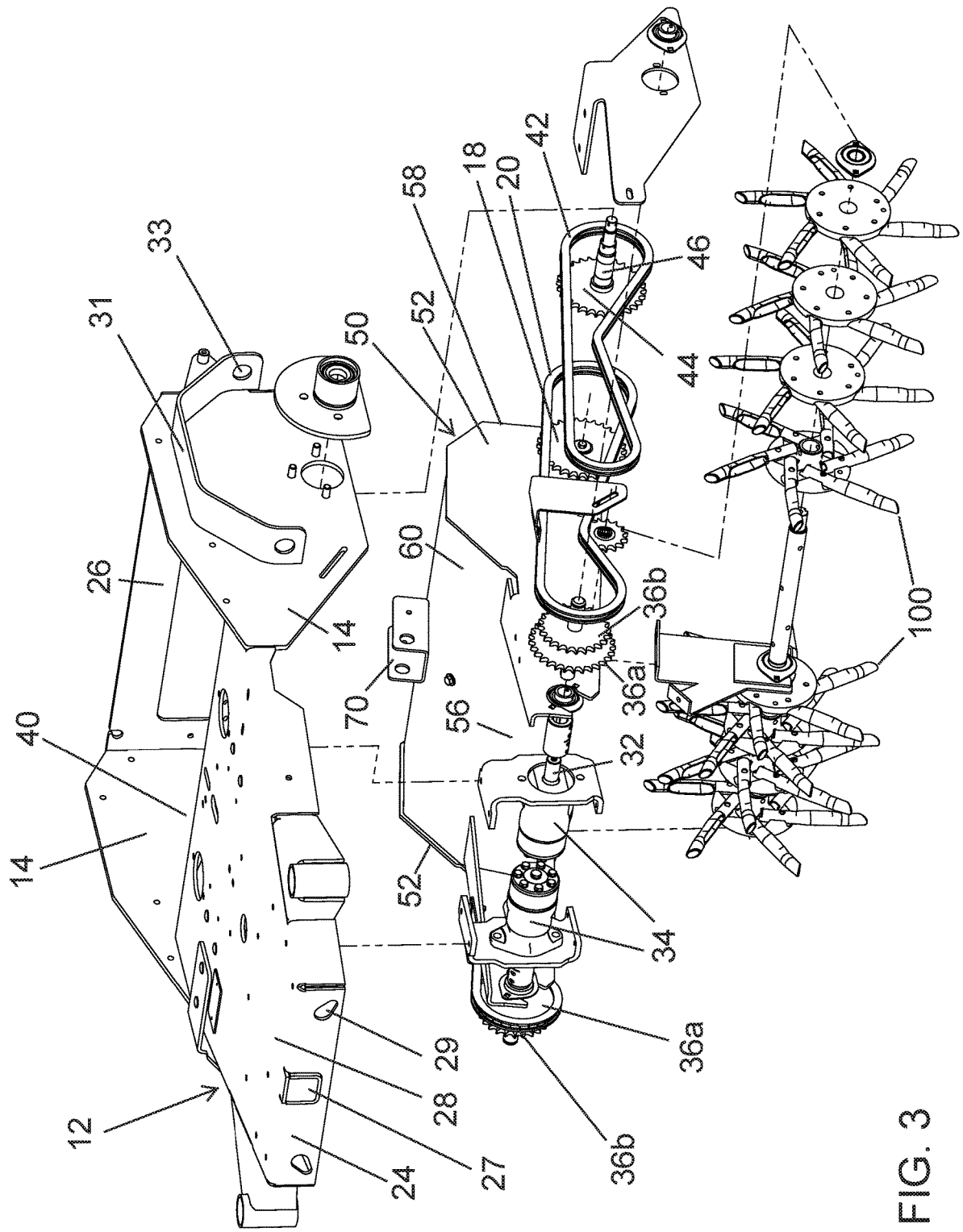
FIG. 3 shows an exploded perspective view of various components of the aerating apparatus of FIG. 2.

In the embodiments shown in FIGS. 2 and 3, a pair of tine assemblies 100 is driven at their outer ends by a sprocket 18 in gearing relation to a drive chain 20. Further, in the embodiments shown, tine assemblies 100 are each of the type shown and described in U.S. patent application Ser. No. 13/282,095 (U.S. Pat. No. 9,474,196), which is hereby incorporated herein by reference. All bearings on the tine shafts, wheels, casters, and jackshafts are sealed bearings and may not need to be greased by the user at given intervals. This saves the user time in maintenance, and also reduces the possibility that maintenance is forgotten which thereby leads to bearing failures and costly repairs for the user.

In the embodiments shown, chassis 12 of turf aerator 10 includes a rectangular opening 40 in top plate 28 between side plates 14 and spaced from front plate 24 and generally located over tine assemblies 100. A tine housing 50 is pivotably secured to chassis 12 and extends within opening 40 in chassis 12. Tine housing 50 includes first and second side sheets 52 located inwardly of side plates 14 of chassis 12. Further, front and back sheets 56 and 58 of tine housing 50 extend between side sheets 52 intermediate the front and back ends and at the back ends thereof respectively. Tine housing 50 further includes a top sheet 60 extending between front and back sheets 56 and 58 and extending between side sheets 52. Top sheet 60 and front and back sheets 56 and 58 extend generally perpendicular to side sheets 52. Tine assemblies 100 are rotatably mounted relative to chassis 12 about an axis parallel to the turf, with tine assemblies 100 including a plurality of tines extending circumferentially and perpendicularly from the axis of tine assemblies 100. Particularly, tine assemblies are rotatably mounted to tine housing 50 between side sheets 52 and front and back sheets 56 and 58 and under top sheet 60, with the outer ends and sprockets 18 of tine assemblies 100 located outside of side sheets 52. Although the word sheets are used to describe various components such as the top sheet 60 and side sheets 52, it should be understood that these components can likewise be considered support members in general or frames that form the overall shape of the components, and may not necessarily be manufactured as sheets of material.

The chassis 12 can also include a front attachment receiver 27 which can be used to secure the attachment 110 thereto. In this example, the attachment receiver 27 forms a U-shaped channel extending in a longitudinal direction and which is or can be square or rectangle. Front plate 24 extends from both sides of front attachment receiver 27 generally perpendicular to the longitudinal direction of front attachment receiver 27. Chassis 12 also includes holes 29, in this example shaped as a tear-drop for improved ease of use and functionality, which can be used for one or both purposes of securing the aerator turf machine for transport or for securing the attachment 110 thereto. In addition, holes 31 on side fenders 33 can be used to better secure the turf aerator during transport. In this regard, the holes 31 can be referred to as tie-down holes in which a user can use to better secure the turf aerator during transportation. In the example depicted in FIG. 3, the attachment receiver 27 is shown at least partially on front plate 24 and top plate 28, however, the attachment receiver can additionally or alternatively be positioned on one or the other as well. Additional U-shaped channels can also be used for additional support. Furthermore, although FIG. 3 depicts the holes 29 positioned on front plate 24, alternatively or additional holes can be positioned on top plate 28.

Turf aerator 10 further includes a pair of hydraulic motors 34 mounted to chassis 12 between opening 40 and front plate 24 and having output shafts 32 aligned with each other and extending generally perpendicular to side plates 14. Tine housing 50 is pivotably connected to chassis 12 by having the front ends of side sheets 52 rotatably coupled to output shafts 32 which are parallel to, but spaced from, the rotation axis of tine assemblies 100. Each output shaft 32 includes a sprocket 36a in gearing relation to drive chain 20 for driving the corresponding tine assembly 100. Each output shaft 32 further includes a sprocket 36b in gearing relation to drive chain 42. Drive chain 42 is in gearing relation to a sprocket 44 on a stub axle 46 of drive wheel 48, with stub axle 46 rotatably mounted to the corresponding side plate 14 of chassis 12 adjacent to back plate 26. It should then be appreciated that drive chains 20 and 42 are located intermediate side sheets 52 and side plates 14, and particularly are located exteriorly of tine housing 50.

Other manners for operating the tine assembly in addition to or as an alternative to the drive chains can include a hydraulic motor that is coupled directly or indirectly to the tine assembly, such that the hydraulic motor itself powers the tine assembly. Other manners for operating the tine assembly can include a belt, such as a v-belt, in place of the drive chains, in which case pulleys can be used in place of the sprockets. In each of these additional or alternative examples, the components may likewise be positioned where the drive chains are located, that is, exterior to the tine housing 50, so that each of the components can likewise be protected from the tine assemblies in operation. These alternative operational methods which can operate the tine assemblies can also be utilized for the wheels as well, such that operating the wheels can likewise utilize a hydraulic motor or a v-belt with a pulley system. In this regard, the first and second drives can be in fixed timing with each other such that the wheels and tine assemblies operate in tandem. The second drive can be positioned such that the second side support member is at least partially positioned between the tine assembly and the second drive.

Although the figures depict the tine assemblies 100 being mounted to the tine housing 50, which is distinct from the chassis 12, the tine housing 50 may alternatively be a single component with the chassis 12. For example, the tine assemblies 100 may be rotatably mounted to the chassis 12 itself. Furthermore, since the tine housing 50 can be formed as part of the chassis 12, any discussion of components with respect to the tine housing can be formed as the chassis as well, including the front and back sheets 56 and 58 and the side sheets 52. In this regard, the chassis can be formed of a pivoting portion which is mounted to the tine assemblies and a fixed portion. Thus, the chassis itself may include the pivot in which case the tine assemblies and the pivoting portion of the chassis connected to the tine assemblies can pivot relative to the remainder of the chassis (e.g., the fixed portion) in accordance with the elongation and retraction of the hydraulic cylinder. Any discussion of tine housing 50 can alternatively be considered as being a discussion with respect to the chassis 12 itself, such as the pivoting portion of the chassis.

Chassis 12 further includes a console 16 shown as including a pair of side portions 62 secured to side plates 14 and upstanding therefrom. A top portion 64 extends between and is secured to the upper ends of side portions 62. A support shaft 66 extends between side portions 62 parallel to and spaced from top plate 28 and intermediate top portion 64 and tine housing 50.

Figure 4:
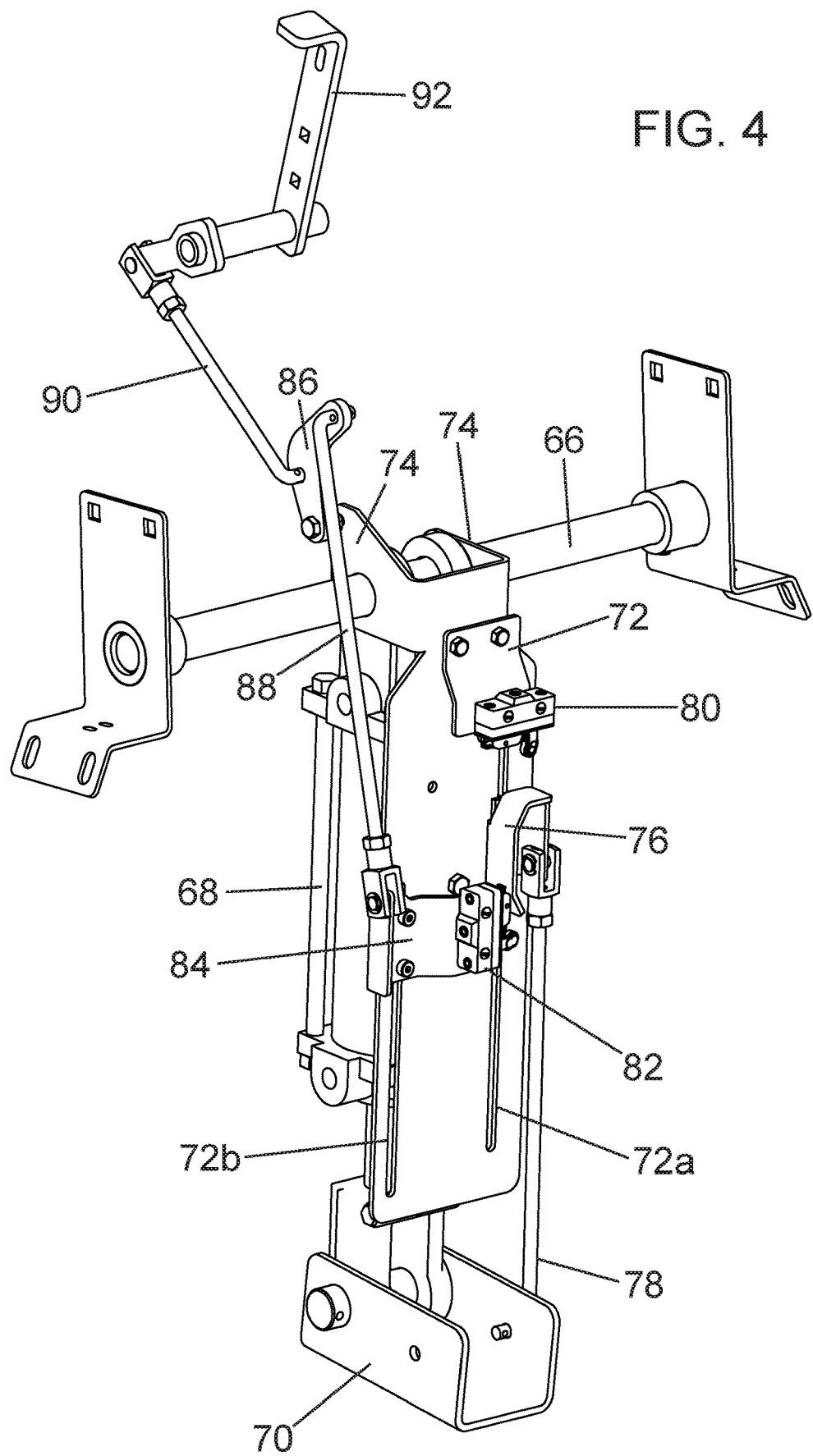
FIG. 4 shows a perspective view of other components of the aerating apparatus of FIG. 1.

Referring to FIG. 4, the upper end of a hydraulic cylinder 68 is pivotably connected to support shaft 66. The lower end of the hydraulic cylinder 68 is pivotably connected to a U-shaped bracket 70 secured to top sheet 60 of tine housing 50. Thus, by extending and retracting hydraulic cylinder 68, tine housing 50 and tine assemblies 100 therein are pivoted relative to chassis 12. As discussed above and in another example, if the chassis forms the components of the tine housing such that it is all a fluid piece or connection, then that portion of the chassis can move, or pivot, relative to the remainder of the fixed portion of the chassis based on the elongation and retraction of the hydraulic cylinder.

A bracket 72 is pivotably secured to support shaft 66 such as by extending support shaft 66 through a pair of ears 74 extending generally perpendicular to bracket 72 and located on opposite sides of the upper end of hydraulic cylinder 68. A trip 76 is movably mounted relative to a bracket 72 in a direction perpendicular to support shaft 66 and parallel to hydraulic cylinder 68, such as by having fasteners of trip 76 extend through an elongated slot 72a. The positions of trip 76 relative to bracket 72 correspond to the elongation or retraction of hydraulic cylinder 68, such as by a rod 78 having its upper end pivotably connected to trip 76 and its lower end pivotably connected to U-shaped bracket 70 and extending generally parallel to hydraulic cylinder 68.

For controlling the amount of retraction and elongation of hydraulic cylinder 68, a first switch 80 is suitably secured to an upper end of bracket 72, which is engageable by trip 76 to define the maximum retraction of hydraulic cylinder 68. A second switch 82 is mounted to bracket 72 for movement parallel to the movement of trip 76 relative to bracket 72, which is engageable by trip 76 to define the maximum elongation of hydraulic cylinder 68. In the form shown in FIG. 4, switch 82 is mounted to a bracket 84 having fasteners extending through an elongated slot 72b which is parallel to and spaced from slot 72a. For moving switch 82 relative to switch 80, a J-shaped crank arm 86 is pivotably mounted to one ear 74 at its first end. A slide rod 88 has its first end pivotably connected to a first end of crank arm 86 intermediate its ends and a second end pivotably connected to bracket 84. A handle rod 90 has a first end pivotably connected to a second end of crank arm 86 and a second end pivotably connected to a depth control lever 92 pivotably mounted in console 16 and extending outwardly of top portion 64.

Referring to FIG. 1, a switch 94 controls the retraction and elongation of hydraulic cylinder 68 between the extents defined by switches 80 and 82. In the form illustrated, switch 94 is located on an operator platform 96 mounted to chassis 12. In the form illustrated, operator platform 96 uses the rubber isolator mounting system disclosed in U.S. Pat. No. 8,632,018, which is hereby incorporated herein by reference. Also, operator platform 96 has a rubber mat 104 with holes in it to help with operator fatigue. Mat 104 can be flipped up for ease of cleaning dirt and debris that can accumulate while aerating. Operator platform 96 also has a lock 102 to keep it from accidentally flipping up with the user still on operator platform 96. The lock 102 can engage with a corresponding bore in the operator platform 96 which thereby prohibits the operator platform from moving. For example, when the operator platform is in use, that is, it extends parallel to the ground, the lock prohibits the operator platform from moving upwards in a closed position. Likewise, when the operator platform is positioned upward, or perpendicular to the ground, the lock can prohibit the operator platform from falling downward. Thus, the lock 102 can be disengaged to rotate operator platform 96 up and then, once the operator platform is in the up position, re-locked to hold it up. This aids in providing access to the user to the tine assemblies 100 in order to clean them.

Although switches and trips are shown in the figures and described, other electronic or mechanical mechanisms can also be implemented to serve a similar such purpose. Thus, the switch may be considered a variable position mechanism or device and the trip may be considered a triggering mechanism. For example, a magnetic pick-up sensor can be used to identify the presence of a magnet which may replace the trip. Other sensory devices can also be utilized such as a proximity sensory, and the like which can detect the approach of an object such as the trip. Furthermore, if sensors are utilized in which signals, such as digital signals, are ultimately transmitted to one or more processors (e.g., CPU), or otherwise a controller, micro-controller, etc., which can thereby control the operation of the hydraulic cylinder. In this regard, the turf aerator can include other components typically associated with computing devices in addition to the sensors and processors mentioned, such as memory configured to install data and instructions executable by the one or more processors, a display screen as an output mechanism, and an input mechanism for the user to control the turf aerator.

Figure 5:
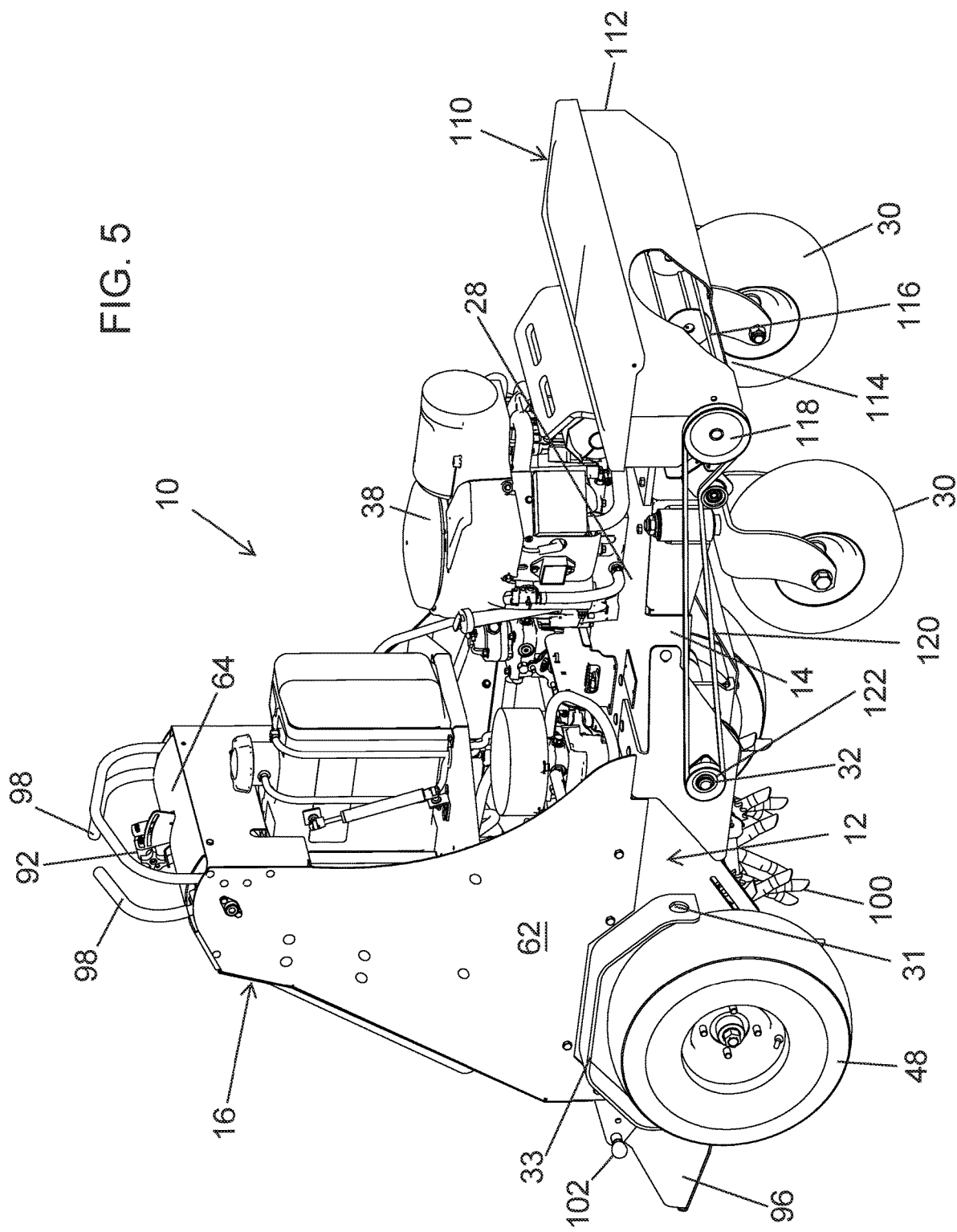
FIG. 5 shows a perspective view of the aerating apparatus of FIG. 1 including an attachment driven with the tine assembly and drive wheel.

Attachments such as drop seeder, drop spreader, or broadcast spreader can be installed on the front of the machine. In the illustrated form, an attachment 110 is suitably secured to front plate 24 and is powered by at least one hydraulic motor 34 with its corresponding tine assembly 100 and drive wheel 48. Attachment 110 is shown as being a drop seeder, but attachment 110 could be of other forms and types useful in turf management and, especially, in cooperation with aeration, including, but not limited to, a broadcast spreader, a drop spreader, or the like. FIG. 5 shows a drop seeder 112 that is powered by a v-belt 120 that is connected to hydraulic motor 34 by pulley 112. The agitator 116 in the seeder 112 runs proportionate to ground speed as the hydraulic motor also runs the wheels of the turf aerator.

In the form shown, attachment 110 includes a seeder 112 for holding seeds for dispensing out of an adjustable lower opening 114. In this regard, controls for adjusting lower opening 114 could be routed up to console 16 which the operator could easily reach during operation. The agitator 116 is provided inside of seeder 112 having a pulley 118 exterior of seeder 112. Pulley 118 and agitator 116 are shown as being powered by the belt 120, which in this example is a v-belt, extending between pulley 118 and a pulley 122 provided on output shaft 32 outwardly of side plate 14. Although only shown as being driven by one hydraulic motor 34 with one drive wheel 48 and one tine assembly 100, attachment 110 could also be powered by the other hydraulic motor 34 with the other drive wheel 48 and the other tine assembly 100.

Figure 6:
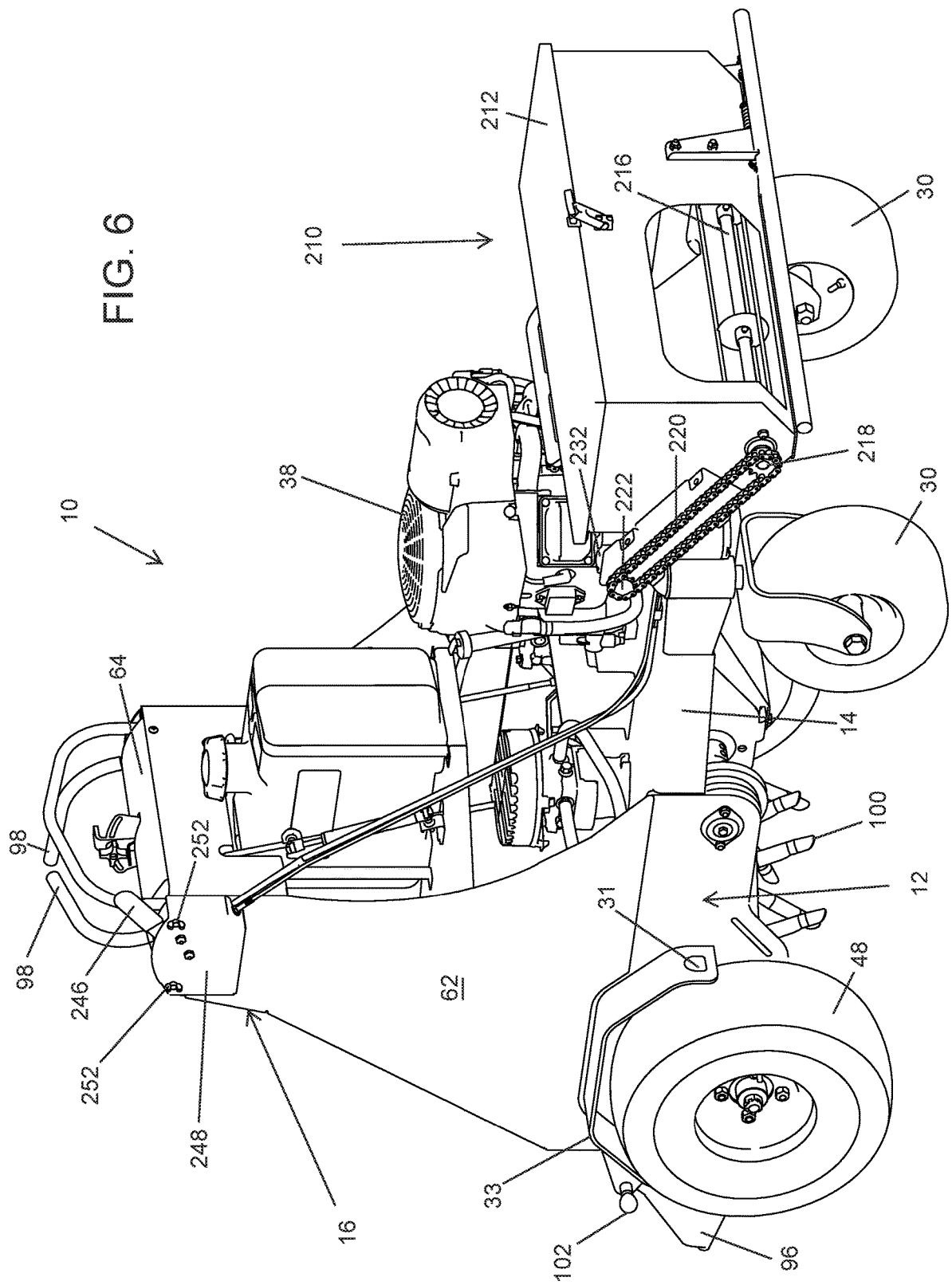
FIG. 6 shows a perspective view of the aerating apparatus of FIG. 1 including an attachment driven by a motor.
Figure 7:
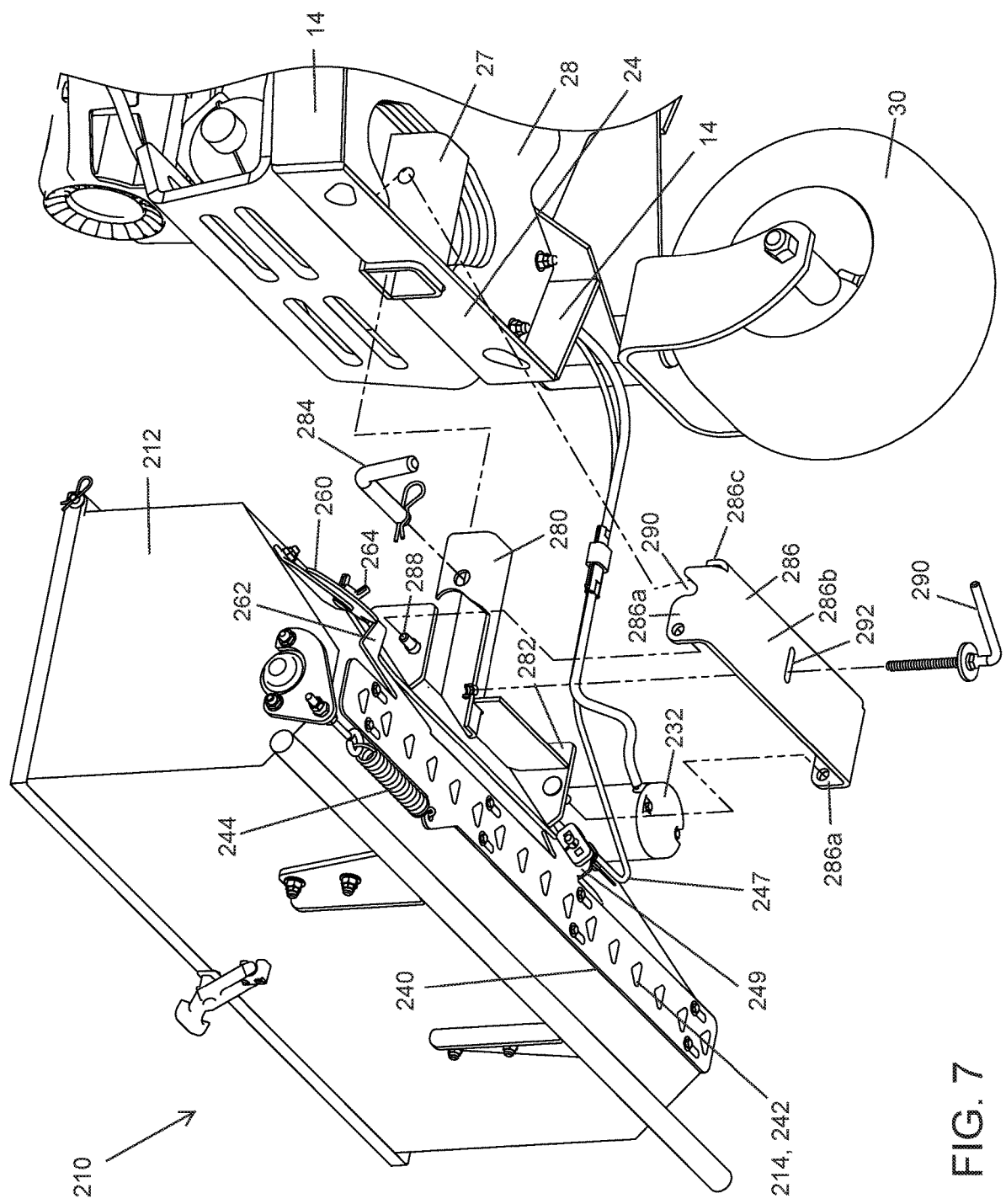
FIG. 7 shows an exploded, bottom perspective view of the attachment of FIG. 6 and the aerating apparatus of FIG. 1, with portions broken away.
Figure 8:
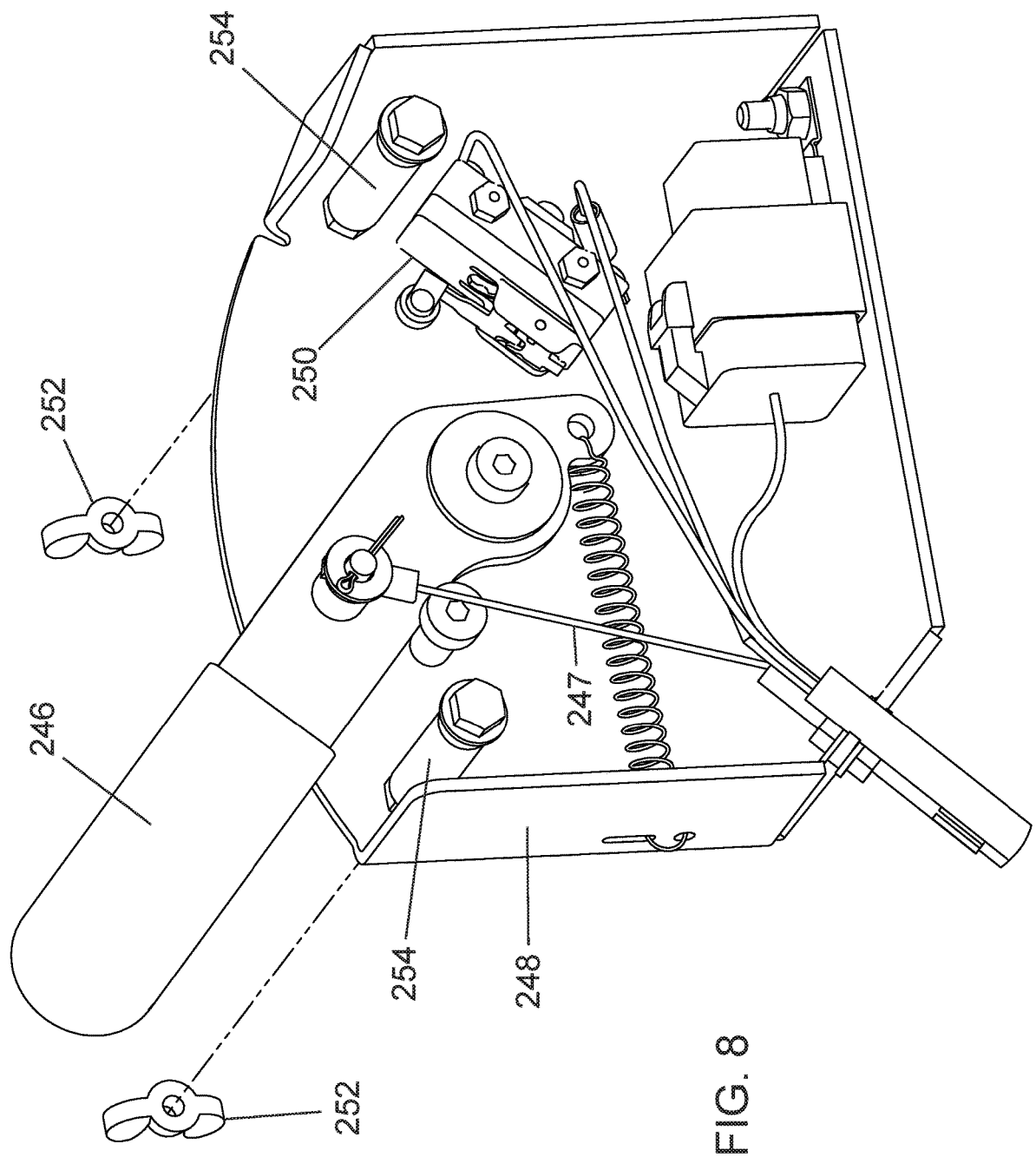
FIG. 8 shows a perspective view of a portion of the attachment of FIG. 6.
Figure 9:
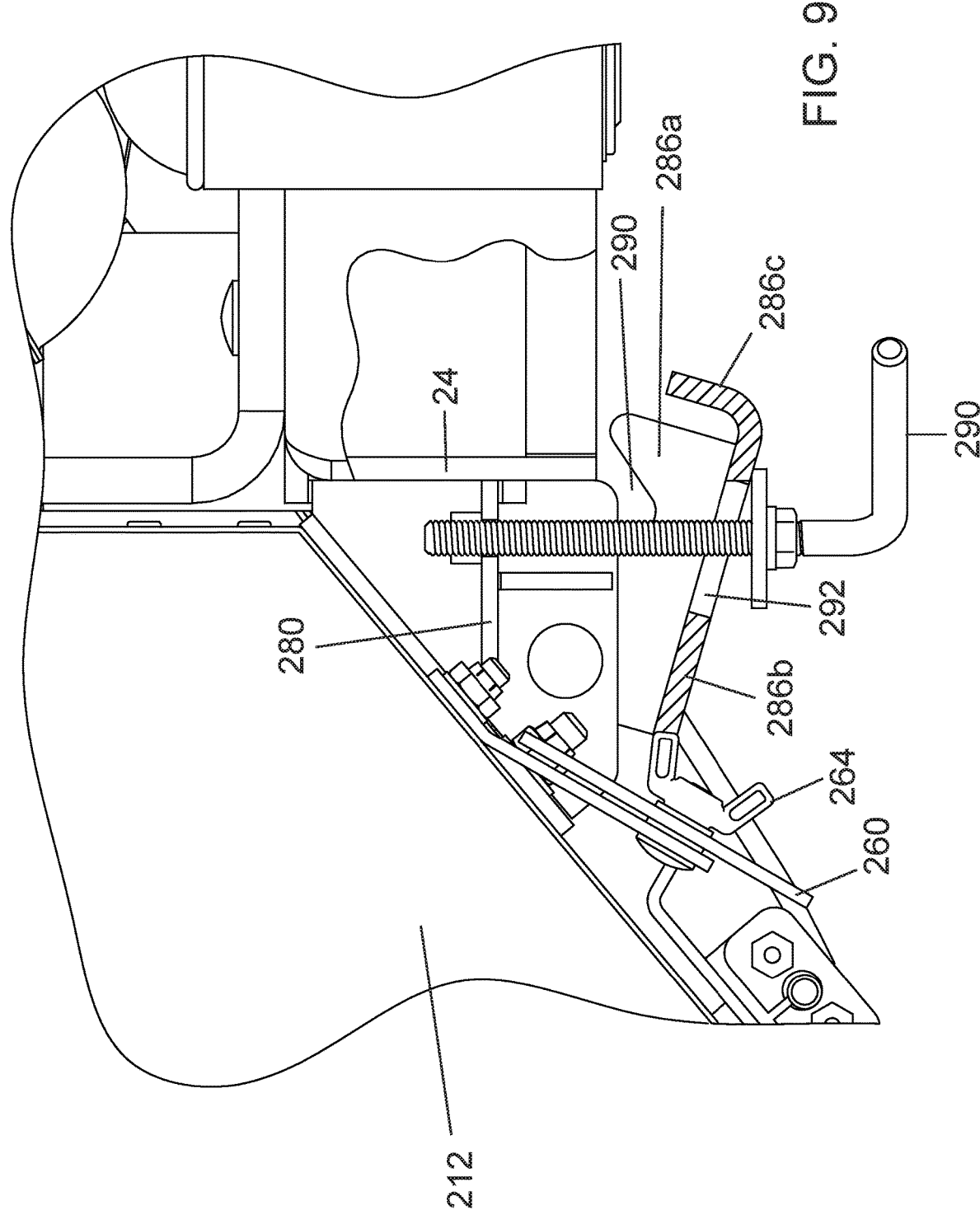
FIGS. 9 and 10 show partial cross sectional views of the attachment of FIG. 6 and the aerating apparatus of FIG. 1.
Figure 10:
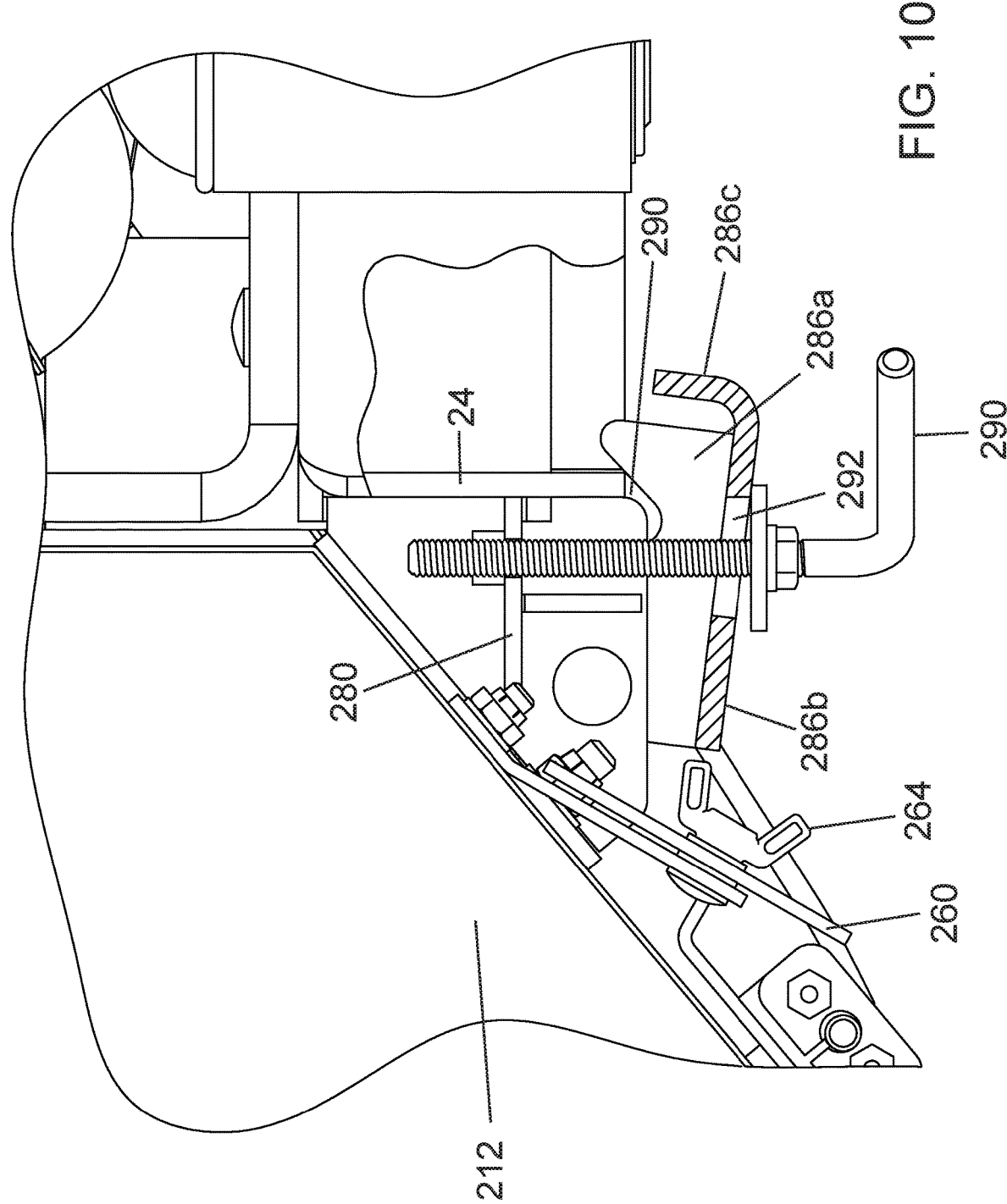
Figure 11:
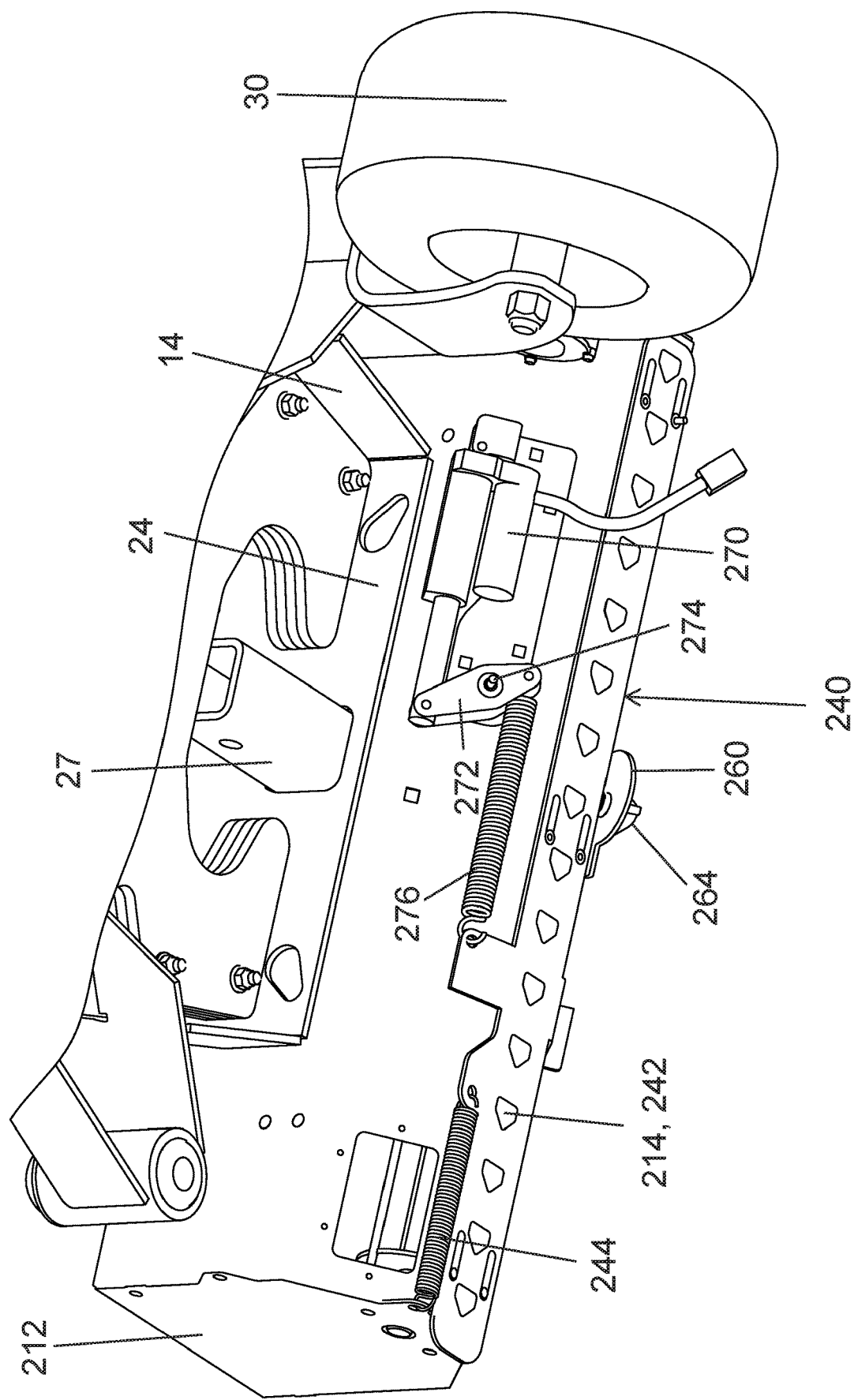
FIG. 11 shows a bottom perspective view of an attachment including a linear electric actuator.

In a further illustrated form, an attachment 210 is suitably secured to front plate 24 and is powered by at least one electric motor 232. Attachment 210 is shown as being a drop seeder, but attachment 210 could be of other forms and types useful in turf management and, especially, in cooperation with aeration, including, but not limited to, a broadcast spreader or the like. FIG. 6 shows a hopper 212 for holding seeds for dispensing out of a plurality of spaced lower openings 214. An agitator 216 is provided inside of hopper 212 having a sprocket 218 exterior of hopper 212. Sprocket 218 and agitator 216 are shown as being powered by a continuous drive member 220, which in this example is a roller chain, extending between sprocket 218 and a sprocket 222 provided on electric motor 232 mounted outside of hopper 212. Motor 232 runs at a constant speed, and there is no variation with ground speed. Agitator 216 does not meter the seed and only keeps it flowing.

A valve plate 240 is slideably mounted to the bottom of hopper 212 and extends over lower openings 214, such as by fasteners extending through elongated slots. Valve plate 240 also includes a plurality of spaced valve openings 242 of a size and spacing corresponding to lower openings 214. Valve plate 240 is biased to an open position, such as by a spring 244, with valve openings 242 aligned with lower openings 214. A lever 246 is pivotable relative to chassis 12 by being pivotably mounted to a housing 248 removably fixed to one side portion 62 of console 16. A cable 247 extends from lever 246 to a tab 249 on valve plate 240. Lever 246 is pivoted between a closed position to an open position with cable 247 moving valve plate 240. In the form shown, spring 244 closes valve plate 240 (i.e. valve openings 242 aligning with lower openings 214) when lever 246 is pivoted past over center. Lever 246 engages with a switch 250 mounted in housing 248 in the closed position, with switch 250 controlling electric motor 232 to drive agitator 216 when lever 246 is in the open position and to not drive agitator 216 in the closed position. As switch 250 is activated with lever 246 which opens or closes valve plate 240, the user does not have to remember to turn electric motor 232 on or off. Housing 248 is removably mounted to console 16, without the use of tools, such as by wing nuts 252 threaded on bolts 254 extending from side portion 62 and through housing 248. A cam 260 is rotatably mounted on the bottom of hopper 212 for abutting with a follower tab 262 extending from valve plate 240. Cam 260 is adjustably fixed to hopper 212 such as by a wing nut 264. By loosening wing nut 264, the degree to which valve openings 242 align with lower openings 214 can be adjusted.

In a further form shown, valve plate 240 is moved by a linear electric actuator 270. Specifically, actuator 270 is pivotably connected to an end of a pivot arm 272 pivotably mounted intermediate its ends about an axis 274 fixed to hopper 212. The opposite end of pivot arm 272 is connected by a spring 276 in turn connected to valve plate 240. Thus, by elongating or retracting linear electric actuator 270, valve plate 240 is moved under or against the bias of spring 244. Switch 94 controlling linear electric actuator 270 and electric motor 232, is suitably mounted on turf aerator 10 to be conveniently operated by the user, such as mounted on operator platform 96. Thus, by operating switch 94, switch 94 controls hydraulic cylinder 68 as well as linear electric actuator 270, so attachment 210 is actuated once tine assemblies 100 are engaged and is automatically stopped when tine assemblies 100 are disengaged.

In the form shown, attachment 210 is mounted to a hitch 280 mounted to hopper 212 by brackets 282. Hitch 280 is slideably received in receiver 27 and is removably fixed therein by a pin 284. A lock 286 is pivotably mounted to brackets 282. Specifically, lock 286 includes first and second side plates 286a located on opposite sides of the longitudinal direction of hitch 280, a bottom plate 286b extending between side plate 286a, and a rear plate 286c extending upward generally perpendicular to bottom plate 286b and located intermediate and spaced from side plates 286a. Side plates 286a are pivotably mounted to brackets 282 about an axis 288 extending parallel to and spaced from rear plate 286c. Side plates 286a include downwardly extending slots 290 for slideably receiving the lower edge of first plate 24. Lock 286 is pivotable between a locked position with the lower edge of first plate 24 received in slots 290 on opposite sides of receiver 27 and rear plate 286c abutting with receiver 27 and an unlocked position with slots 290 and lock 286 spaced from front plate 24 and receiver 27. In the locked position, any slop between hitch 280 and receiver 27 is removed, removing vibration caused from the slop. Furthermore, in the lock position, pin 284 is only necessary as a redundancy for safety.

Lock 286 is suitably pivotably moved between the locked and unlocked positions by any suitable provisions. In the form shown, an L-shaped rod 290 extends in a plane extending in the longitudinal direction away from hitch 280 and along an axis perpendicular to axis 288 through a slot 292 in bottom plate 286b and is threaded into hitch 280. By threading L-shaped rod 290 into hitch 280, bottom plate 286b and thus lock 286 is moved from the unlocked position to the locked position, and vice versa. However, pivoting of lock 286 can be accomplished in other manners including, but not limited to, using straps, abutment bolts, or the like.

Attachments 110 and 210 allow the user to seed while aerating, seeding every pass. In the form shown, the user engages lever 246 on console 16 at the beginning of each pass and disengages at the end of each pass. Attachments 110 and 210 spread seed the same width as the aeration width. There is no danger of accidentally spreading seed into flower beds. Attachments 110 and 210 can be installed or removed without tools, allowing the user to easily take it off if they are only doing aerations without seeding for the day.

Housing 248 mounted on console 16 comes off with just two wing nuts 252. The power cord for electric motor 232 has a connector up by housing 248 that gets disconnected. This plus the locking system do not require any tools to take attachment 210 off and on turf aerator 10, allowing the user the ease of not having attachment 210 on turf aerator 10 if they have a day where they are only aerating and not seeding. Seeding is more commonly done in the fall, so many times during spring aeration they will not need attachment 210 installed.

Figure 12:
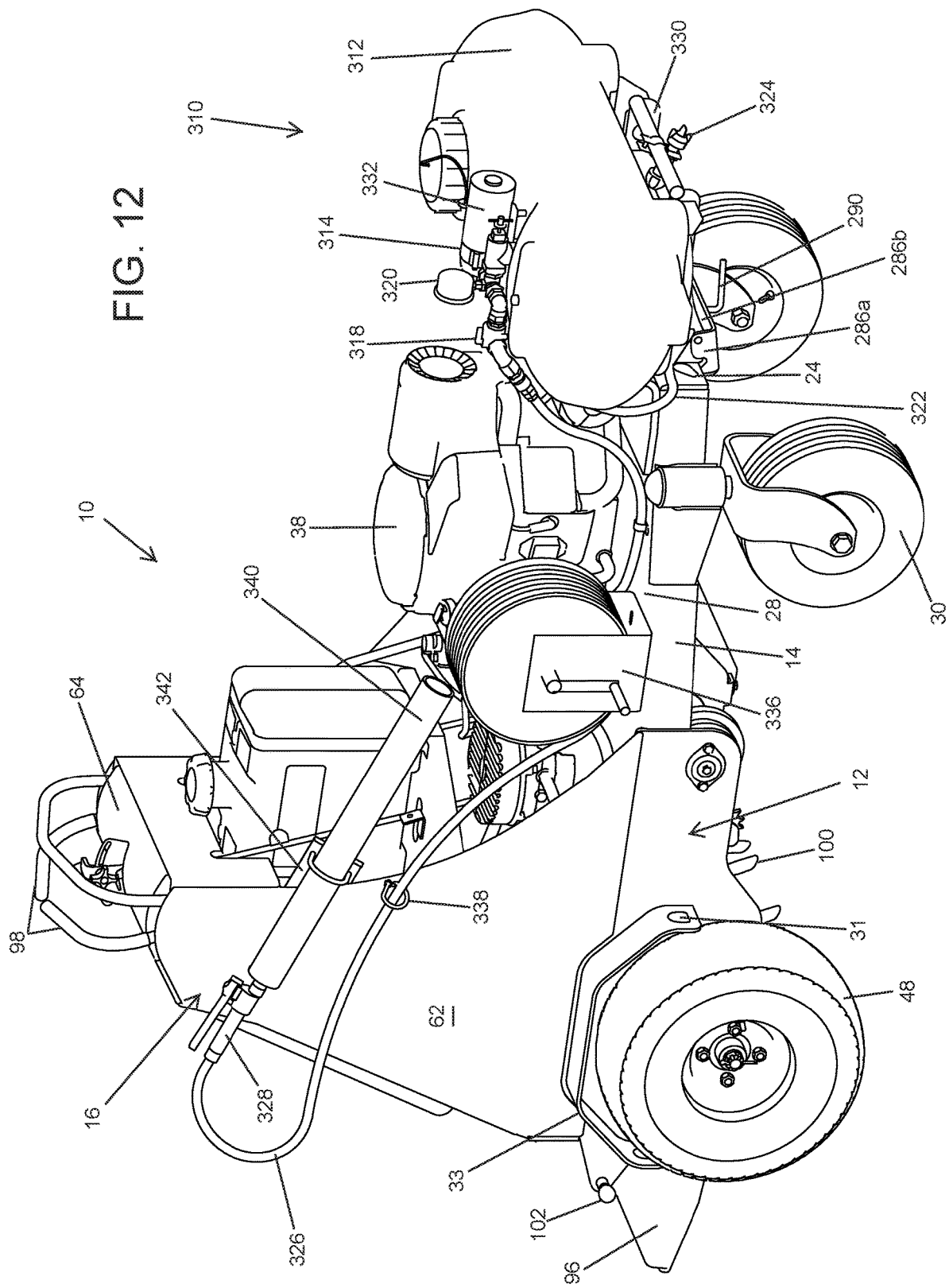
FIG. 12 shows a perspective view of the aerating apparatus of FIG. 1 including an attachment driven by a motor.
Figure 13:
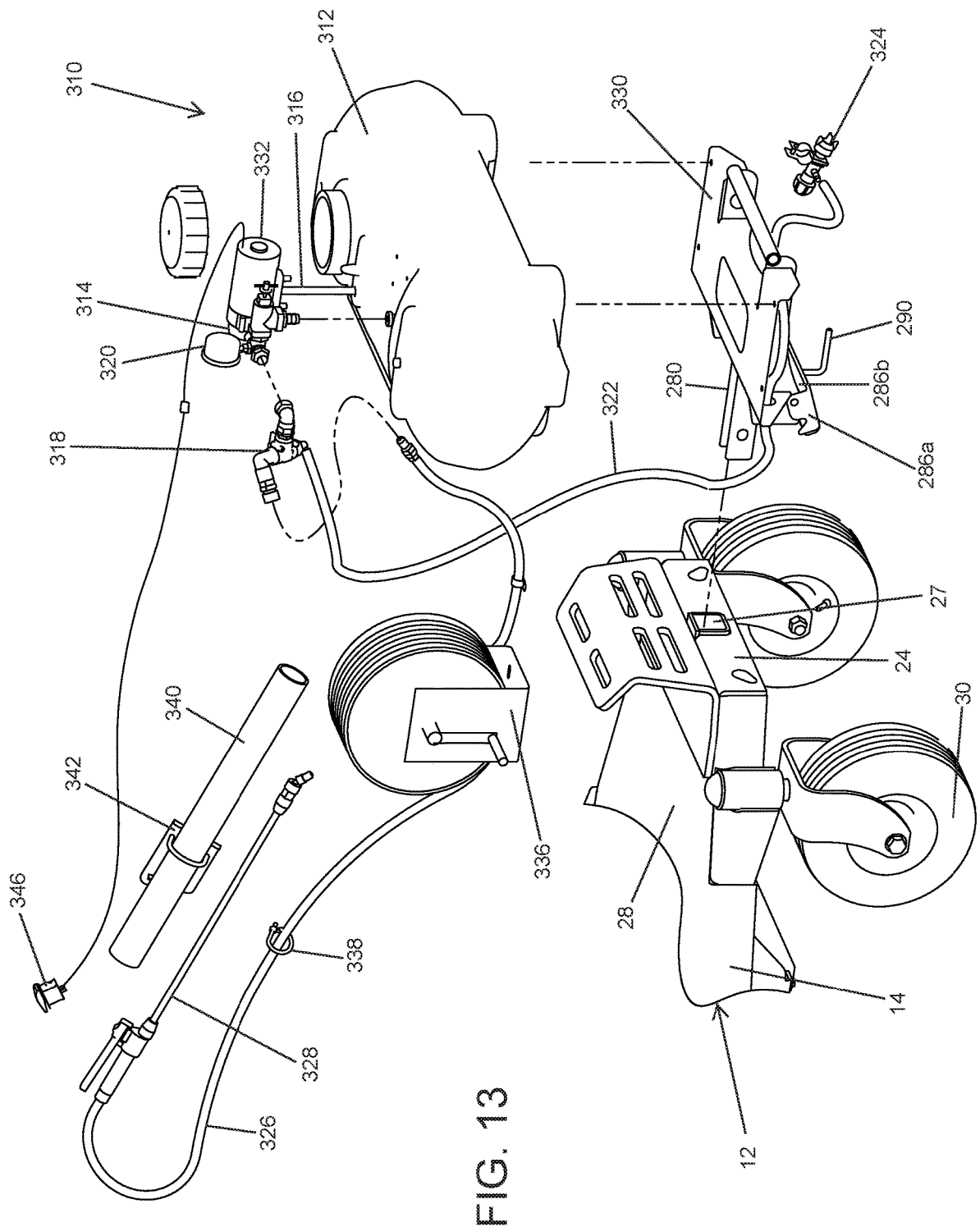
FIG. 13 shows an exploded, perspective view of the attachment of FIG. 12 and the aerating apparatus of FIG. 1, with portions broken away.

In an additional illustrated form, an attachment 310 is suitably secured to front plate 24 and is powered by at least one electric motor 332. Attachment 310 is shown as being a sprayer unit, but attachment 310 could be of other forms and types useful in turf management and, especially, in cooperation with aeration, including, but not limited to, a broadcast spreader or the like. FIG. 12 shows a tank 312 for holding a liquid such as herbicides, insecticides, or the like. A pump 314 driven by electric motor 332 includes an inlet hose 316 extending into and in communication with the liquid held in tank 312. Pump 314 is in fluid communication with a manually operated valve 318 after a pressure regulator and gauge 320. Valve 318 is positionable to be in fluid communication with a first hose 322 terminating in a wide angle spray nozzle 324 and with a second hose 326 terminating in a manually operated spray wand 328.

Hitch 280 is mounted to tank 312 by a mount bracket 330. With hitch 280 slideably received in receiver 27, mount bracket 330 and tank 312 are held generally horizontally and parallel to the ground. Nozzle 324 is mounted to mount bracket 330 in the arrangement as disclosed in U.S. Pat. Nos. 8,056,828; 8,632,018; and 10,194,582. Hose 326 is wound around a reel 336 which is mounted to top plate 28 of chassis 12 adjacent motor 38. Hose 326 extends from reel 336 through a direction loop 338 secured to one of the pair of side portions 62. Wand 328 is removably positioned in a tube 340 fixed to the one of the pair of side plates 62 by a mounting bracket 342 above direction loop 338. Attachment 310 allows the user to apply a liquid while aerating. With valve 318 positioned to communicate with hose 322, the user activates a switch 346 on console 16 to activate or deactivate motor 332 and pump 314, such as at the beginning or ending of each pass. In the form illustrated, spray nozzle 324 sprays liquid the same width as the aeration width. There is no danger of accidentally spraying liquid into flower beds. With valve 318 positioned to communicate with hose 326, the user can remove wand 328 from tube 340 and point it at areas desired to be sprayed within or outside the aeration width. By activating switch 346 on console 16, the application of liquid can be completed using wand 328.

Attachment 310 can be installed or removed without tools, allowing the user to take it off if they are only doing aeration without liquid application for the day. Reel 336, direction loop 338 and mounting bracket 342 are permanently mounted on chassis 16, but hose 326 comes off valve 318 utilizing a coupler. The power cord for electric motor 332 has a connector that gets disconnected. This plus the locking system do not require any tools to take attachment 310 off and on turf aerator 10, allowing the user the ease of not having attachment 310 on turf aerator, if they have a day where only aerating and not liquid application is desired.

Turf aerator 10 eliminates the need for the user to have to adjust hydraulic pressure, by instead having the user set a desired depth and automatically adjusting hydraulic pressure to produce the correct down pressure. The depth will stay consistent and does not require constant adjustment by the user. The only condition where the depth will be less than set is when the soil is too hard and the down pressure required for that depth is more than the maximum created by the weight of turf aerator 10. In this case, tine assemblies 100 will not penetrate to the depth selected. This is the same as conventional machines when they are at their maximum hydraulic pressure. To engage tine assemblies 100 in the ground, the user steps on switch 94 on operator platform 96 and keeps switch 94 down. To disengage tine assemblies 100, the user steps off switch 94.

Turf aerator 10 allows the user to set a fixed depth by having depth control lever 92 that is infinitely variable to set depth. That is, infinitely variable may be defined between the two points in which the depth control lever can extend. Thus, the user can adjust the depth control lever at any location between which the lever operates, such as may be defined by the top portion 64. There are two switches 80 and 82, one for the raised position (remains fixed) and one for the lowered position (variable and is attached by linkage to depth control lever 92). As depth control lever 92 is moved forward or backward, it increases or decreases the tine depth by moving switch 82 down or up. Trip 76 is moveably attached to tine housing 50, which trips either raised position switch 80 or lowered position switch 82. When the user is not standing on foot switch 94, the manifold allows hydraulic cylinder 68 to retract, lifting tine assemblies 100 out of the ground. Hydraulic cylinder 68 retracts until trip 76 trips raised position switch 80. When the user stands on foot switch 94, the manifold forces hydraulic cylinder 68 to extend until trip 76 trips lowered position switch 82. Turf aerator 10 also allows the user to easily set different depths for different lawns based on customer preference, without having to make a few passes to gauge soil conditions. As an alternative embodiment, both the first and second switches can be variable, that is, adjustable by the user using depth control levers or other adjustable mechanisms.

Additionally, turf aerator 10 has tine housing 50 shielding tine assemblies 100 attached to the tine shaft, so the whole assembly raises and lowers. Since it is all independent of chassis 12, turf aerator 10 allows drive chains 20 and 42 to be on the outside of tine housing 50, which shields drive chains 20 and 42 from the dirt and debris of aerating. This improves chain life and creates less down time for the user. Turf aerator 10 also minimizes the number of chains and belts, with only one belt to run the hydraulic pumps and four drive chains 20 and 42 running off hydraulic motors 34 to run each wheel 48 and each tine assembly 100. Also, the belt has a spring tensioner to help take up slack in the belt as it stretches with wear.

To operate turf aerator 10, the user presses forward on handles 98, which operates hydraulic motors 34, to go forward; pulls back on handles 98, which operates hydraulic motors 34, to go in reverse; presses forward on left handle 98 farther than the right handle 98, which operates hydraulic motors 34, to turn right; and presses forward on the right handle 98 farther than the left handle 98, which operates hydraulic motors 34, to turn left. This is similar to zero turn radius machines.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Apparatus comprising, in combination: a receiver extending in a longitudinal direction; a front plate extending from the receiver generally perpendicular to the longitudinal direction and having a lower edge; a hitch configured to be slideably received in the receiver; a lock pivotably mounted relative to the hitch between a locked position and an unlocked position, with the lock including a slot configured to receive the lower edge of the front plate, with the lower edge of the front plate located in the slot in the locked position, with the lower edge located outside the slot in the unlocked position, wherein the lock includes first and second side plates located on opposite sides of the longitudinal direction of the hitch, with the first and second side plates pivotably mounted relative to the hitch about an axis, with the slot located in the first side plate; a further slot located in the second side plate and configured to receive the lower edge of the front plate, with the lower edge of the front plate on opposite sides of the receiver located in the slot and the further slot in the locked position; and means for moving the lock from the unlocked position to the locked position, wherein the moving means comprises, in combination: a bottom plate extending between the first and second side plates, with the bottom plate including an opening; and a rod extending in a plane in the longitudinal direction away from the hitch and through the opening, with the rod abutting with the bottom plate around the opening and moveable towards the hitch for pivoting the bottom plate and the lock about the axis from the unlocked position to the locked position.

2. The apparatus of claim 1, further comprising, in combination: a pin removably fixed in the receiver and the hitch slideably received in the receiver; and a rear plate extending from the bottom plate towards the slot and the further slot and located intermediate and spaced from the first and second side plates.

3. Apparatus comprising, in combination: a receiver extending in a longitudinal direction; a front plate extending from the receiver generally perpendicular to the longitudinal direction and having a lower edge; a hitch configured to be slideably received in the receiver; a lock pivotably mounted relative to the hitch between a locked position and an unlocked position, with the lock including a slot configured to receive the lower edge of the front plate, with the lower edge of the front plate located in the slot in the locked position, with the lower edge located outside the slot in the unlocked position; a chassis moveably supported on turf, with the chassis including the front plate and the receiver; and a drop seeder mounted to the hitch, wherein the drop seeder comprises, in combination: a hopper configured to hold seeds, with the hopper including a plurality of spaced lower openings configured to dispense the seeds from the hopper, a valve plate slideably mounted to the hopper and extending over the plurality of spaced openings, with the valve plate including a plurality of spaced valve openings, with the valve plate moveable between an open position and a closed position, with the plurality of spaced valve openings aligned with the plurality of spaced lower openings in the open position, with the plurality of spaced valve openings mis-aligned with the plurality of spaced lower openings in the closed position, a lever pivotably mounted relative to the chassis, and a cable extending between the lever and the valve plate, with pivoting the lever relative to the chassis moving the valve plate from the open position to the closed position.

4. The apparatus of claim 3, wherein the drop seeder comprises, in combination: an agitator inside of the hopper; an electric motor mounted outside the hopper, with the electric motor in driving connection with the agitator; and a switch electrically connected to the electric motor and mounted relative to the chassis, with the switch engaged by the lever when pivoting relative to the chassis.

5. The apparatus of claim 4, further comprising, in combination: a housing removably fixed to the chassis, with the lever pivotably mounted to the housing, and with the switch mounted to the housing, with the housing including the lever and the switch being attached to or removable from the chassis as a single unit.

6. The apparatus of claim 5, further comprising, in combination: a linear electric actuator mounted to the hopper; a pivot arm pivotably connected to the hopper, with a first end of the pivot arm pivotably connected to the linear electric actuator; and a spring having a first end pivotably connected to a second end of the pivot arm, with a second end of the spring connected to the valve plate, with the valve plate biased from the closed position to the open position, and with the linear electric actuator configured to elongate or retract to move the valve plate between the closed and open positions.

7. The apparatus of claim 6, further comprising, in combination: a tine assembly rotatably mounted relative to the chassis about an axis parallel to the turf; and a motor mounted to the chassis and in driving connection to the tine assembly, with the motor located intermediate the front plate and the tine assembly, and with the tine assembly including a plurality of tines extending circumferentially and perpendicularly from the axis.

8. Apparatus comprising, in combination: a receiver extending in a longitudinal direction; a front plate extending from the receiver generally perpendicular to the longitudinal direction and having a lower edge; a hitch configured to be slideably received in the receiver; a lock pivotably mounted relative to the hitch between a locked position and an unlocked position, with the lock including a slot configured to receive the lower edge of the front plate, with the lower edge of the front plate located in the slot in the locked position, with the lower edge located outside the slot in the unlocked position; a chassis moveably supported on turf, with the chassis including the front plate and the receiver; a tine assembly rotatably mounted relative to the chassis about an axis parallel to the turf; and a motor mounted to the chassis and in driving connection to the tine assembly, with the motor located intermediate the front plate and the tine assembly, and with the tine assembly including a plurality of tines extending circumferentially and perpendicularly from the axis.

9. The apparatus of claim 8, further comprising, in combination: a sprayer unit, wherein the sprayer unit comprises, in combination: a mount bracket fixed to the hitch; a tank holding liquid and mounted to the mount bracket; a pump including an inlet extending into and in communication with the liquid held in the tank; an electric motor driving the pump; a valve in fluid communication with the pump; a spray nozzle mounted to the mount bracket; a spray wand, with the valve positionable to be in fluid communication with the spray nozzle or the spray wand; a tube mounted to the chassis and slideably receiving the spray wand; and a switch mounted to the chassis and electrically connected to the electric motor.

\* \* \* \* \*